US012767556B2

(12) United States Patent
Takano et al.

(10) Patent No.: US 12,767,556 B2
(45) Date of Patent: Oct. 20, 2026

(54) METHOD FOR MANUFACTURING POSITIVE ELECTRODE ACTIVE MATERIAL FOR LITHIUM ION SECONDARY BATTERY

(71) Applicant: Proterial, Ltd., Tokyo (JP)

(72) Inventors: Shuichi Takano, Tokyo (JP); Hisato Tokoro, Tokyo (JP); Akira Gunji, Tokyo (JP); Shin Takahashi, Tokyo (JP)

(73) Assignee: Proterial, Ltd., Tokyo (JP)

( * ) Notice: Subject to any disclaimer, the term of this patent is extended or adjusted under 35 U.S.C. 154(b) by 563 days.

(21) Appl. No.: 18/280,663

(22) PCT Filed: Feb. 22, 2022

(86) PCT No.: PCT/JP2022/007418
§ 371 (c)(1),
(2) Date: Sep. 6, 2023

(87) PCT Pub. No.: WO2022/202066
PCT Pub. Date: Sep. 29, 2022

(65) Prior Publication Data
US 2024/0300825 A1 Sep. 12, 2024

(30) Foreign Application Priority Data
Mar. 26, 2021 (JP) ................................ 2021-054392

(51) Int. Cl.
*C01G 53/50* (2025.01)
*H01M 10/0525* (2010.01)

(52) U.S. Cl.
CPC ........ *C01G 53/50* (2013.01); *H01M 10/0525* (2013.01); *C01P 2004/61* (2013.01); *C01P 2004/62* (2013.01); *C01P 2006/40* (2013.01)

(58) Field of Classification Search
CPC .............. C01G 53/50; H01M 10/0525; H01M 2004/028; H01M 4/505; H01M 4/525;
(Continued)

(56) References Cited

U.S. PATENT DOCUMENTS 5,096,415 A * 3/1992 Coucher .............. F27D 1/0023 432/112
2016/0156020 A1 6/2016 Tokoro et al.

FOREIGN PATENT DOCUMENTS

CN 111052463 4/2020
CN 111052464 4/2020
(Continued)

OTHER PUBLICATIONS

"International Search Report (Form PCT/ISA/210) of PCT/JP2022/007418", mailed on Apr. 26, 2022, with English translation thereof, pp. 1-4.
(Continued)

*Primary Examiner* — Aiqun Li
(74) *Attorney, Agent, or Firm* — JCIPRNET

(57) ABSTRACT

A method for manufacturing a positive electrode active material for a lithium ion secondary battery involves reacting at least 95 mass % of a lithium compound through a heat treatment step using a rotary firing furnace and having a batch firing process for heating a precursor while rolling the same in a heating region in a furnace tube, wherein the batch firing process has: a tilted input stage for tilting the furnace tube and inputting the precursor from an inlet of the firing furnace; a horizontal firing stage for performing firing while making the furnace tube horizontal; and a tilted discharge stage for tilting the furnace tube and discharging a fired powder from an outlet of the firing furnace.

5 Claims, 3 Drawing Sheets

| STEP | FURNACE STATE | FORWARD ROTATION /REVERSE ROTATION | ROTATION SPEED | TILT ANGLE |
|---|---|---|---|---|
| TILTED INPUT STAGE(a) |   | FORWARD ROTATION | 3 rpm | 3° |
| HORIZONTAL FIRING STAGE(b) |   | FORWARD ROTATION | 1 rpm | 0° |
| TILTED DISCHARGE STAGE(c) |   | REVERSE ROTATION | 3 rpm | 3° |

(58) Field of Classification Search
CPC .............. C01P 2004/61; C01P 2004/62; C01P 2004/51; C01P 2006/40; C01P 2002/52; Y02E 60/10; F27B 7/12; F27B 7/14
See application file for complete search history.

(56) References Cited

FOREIGN PATENT DOCUMENTS

| | | |
|---|---|---|
| CN | 111837265 | 10/2020 |
| JP | H11139829 | 5/1999 |
| JP | H11255541 | 9/1999 |
| JP | 2002277166 | 9/2002 |
| JP | 2005067972 | 3/2005 |
| JP | 2013155989 | 8/2013 |
| JP | 2016110982 | 6/2016 |
| JP | 2019075253 | 5/2019 |
| JP | 2019096422 | 6/2019 |
| JP | 2019160801 | 9/2019 |
| JP | 2021153028 | 9/2021 |
| KR | 20200023468 | 3/2020 |
| WO | 2009098835 | 8/2009 |
| WO | 2017213002 | 12/2017 |
| WO | 2020195790 | 10/2020 |

OTHER PUBLICATIONS

"Search Report of Europe Counterpart Application", issued on Jan. 22, 2025, p. 1-p. 9.
"Request for the Submission of an Opinion of Korea Counterpart Application", issued on Dec. 9, 2025, with English translation thereof, pp. 1-14.

* cited by examiner

| STEP | FURNACE STATE | FORWARD ROTATION /REVERSE ROTATION | ROTATION SPEED | TILT ANGLE |
|---|---|---|---|---|
| TILTED INPUT STAGE(a) |   | FORWARD ROTATION | 3 rpm | 3° |
| HORIZONTAL FIRING STAGE(b) |   | FORWARD ROTATION | 1 rpm | 0° |
| TILTED DISCHARGE STAGE(c) |   | REVERSE ROTATION | 3 rpm | 3° |

METHOD FOR MANUFACTURING POSITIVE ELECTRODE ACTIVE MATERIAL FOR LITHIUM ION SECONDARY BATTERY

CROSS-REFERENCE TO RELATED APPLICATION

This application is a 371 application of the international PCT application serial no. PCT/JP2022/007418, filed on Feb. 22, 2022, which claims the priority benefit of Japan application no. 2021-054392, filed on Mar. 26, 2021. The entirety of each of the above-mentioned patent applications is hereby incorporated by reference herein and made a part of this specification.

TECHNICAL FIELD

The present invention relates to a method for manufacturing a positive electrode active material for a lithium ion secondary battery.

BACKGROUND ART

As small lightweight secondary batteries having a high energy density and contributing to energy saving, lithium ion secondary batteries have become widespread. Compared with other secondary batteries such as nickel-hydrogen storage batteries or nickel-cadmium storage batteries, lithium ion secondary batteries have characteristics of a high energy density and a small memory effect. Therefore, the uses of lithium ion secondary batteries are expanding from small electric power sources for mobile electronics, domestic electric equipment and the like to medium and large electric power sources for stationary power sources for electric power storage devices, uninterruptible power source devices, electric power smoothing devices, and the like or driving power sources for ships, railway vehicles, hybrid railway vehicles, hybrid cars, electric cars and the like.

For lithium ion secondary batteries, there has been a demand for an additional increase in capacity in response to the expansion of the uses or the like. Lithium complex compounds having an α-$NaFeO_2$ type crystal structure are one type of positive electrode active materials for lithium ion secondary batteries. Among this type of lithium complex compounds, $LiNiO_2$-based oxides having a high content rate of nickel exhibit high charge and discharge capacities and are thus being expected to be applied to a variety of uses.

$LiNiO_2$-based oxides are obtained by reacting a transition metal compound and a lithium compound. As the lithium compound at this time, lithium carbonate, lithium hydroxide and the like are used.

From the viewpoint of the manufacturing cost, the use of lithium carbonate, which is inexpensive, has merit. However, since the reaction between lithium carbonate and a transition metal compound generates carbon dioxide ($CO_2$), as the reaction progresses and carbon dioxide is generated, there is a concern that the carbon dioxide concentration in the furnace may increase, a reverse reaction may be caused, and the forward reaction may not progress. That is, the reverse reaction by which the generated lithium complex oxide is decomposed into a transition metal compound and lithium carbonate progresses, and the forward reaction for generating a lithium complex oxide is inhibited. Therefore, in the case of using lithium carbonate as the lithium compound, how to discharge the generated carbon dioxide to the outside of the furnace becomes important.

A rotary firing furnace (hereinafter, referred to as a rotary kiln in the present invention) is considered to be effective for rapidly discharging gases generated in the furnace to the outside of the furnace. This is a furnace capable of thermally treating powders while rolling the same, and generated carbon dioxide is rapidly discharged since the powders are moved.

For example, Patent Literature 1 discloses a rotary kiln including a tubular furnace installed to be made tilted or horizontal.

Patent Literature 2 discloses a method for manufacturing a positive electrode active material for a lithium ion secondary battery in which a precursor (powder) of a lithium complex oxide is fired in a rotary kiln while being rolled, and the temperature of the precursor is repeatedly increased and decreased by rotating the tubular furnace in a forward direction and a reverse direction alternately, whereby the precursor is fired while the temperature of the precursor is kept uniform.

Patent Literature 3 discloses a method for manufacturing a positive electrode active material for a lithium ion secondary battery in which a precursor of a lithium complex oxide is fired in a rotary kiln while being rolled, an oxidizing gas is blown to the precursor advancing in the tubular furnace, and the precursor is fired while carbon dioxide generated from the precursor is evacuated with the stream of the oxidizing gas.

In addition, Patent Literature 4 discloses a method for manufacturing a positive electrode active material for a lithium ion secondary battery in which a blade is provided in a furnace tube, and the furnace tube and the blade are rotated, thereby performing firing with the rolling of a powder and the impact of the blade while suppressing an adhesion phenomenon.

CITATION LIST

Patent Literature

[Patent Literature 1]
Japanese Patent Laid-Open No. 2002-277166
[Patent Literature 2]
PCT International Publication No. WO 2009/098835
[Patent Document 3]
PCT International Publication No. WO 2017/213002
[Patent Literature 4]
Japanese Patent Laid-Open No. H11-139829

SUMMARY OF INVENTION

Technical Problem

In Patent Literature 1 to 4, powders are all fired using a rotary kiln. In firing using a rotary kiln, continuous firing is performed by rotating the tubular furnace in a tilted state or a horizontal state to make a precursor input into a furnace tube advance while rolling the same. Here, since the precursor advances continuously, there has been a problem in that it is difficult to hold the precursor for a long period of time and obtain a sufficient reaction. It is conceivable to enhance the reactivity by keeping the temperature of a precursor uniform by rotating the tubular furnace in the forward direction and in the reverse direction alternately as in Patent Literature 2, but alternate switches of the rotation of the furnace in the middle of firing cause a significant process burden. In addition, performing operation to make a powder generally advance while making the powder advance and retreat by alternately switching the rotation makes the advancing speed extremely slow in the end and forces firing to be performed for a long period of time, which makes it difficult to enhance productivity.

Incidentally, in the case of enhancing productivity by continuous firing, since a precursor advances continuously, it is difficult to hold the precursor in an isothermal heating region evenly heated in the furnace (hereinafter, referred to as a heating region) for a long period of time. A countermeasure thereto for securing the holding time in the heating region is to decrease the tilt angle or to reduce the rotation speed, but this makes the movement of the precursor poor or makes precursor clumps adhere to the furnace wall to form an adhesion layer with an uneven thickness. Once the adhesion occurs, it is difficult for the precursor to move over the clumps, and the amount of the adhering substances increases. In the end, the advancing speed becomes slow, and thus the problem of the adhering substances is likely to be caused, and the productivity becomes poor.

In addition, even when a solid-phase reaction is promoted under a stream of an oxygen gas, while the reaction to form a positive electrode active material progresses on the upstream side where the oxygen concentration is high, generated carbon dioxide is accumulated on the downstream side, and the reaction scarcely progress because the carbon dioxide gas interrupt the formation reaction. As a result, the physical properties of generated fired powder significantly vary.

Due to what has been described above, the present invention provides a method for manufacturing a positive electrode active material for a lithium ion secondary battery in which the solid-phase reaction of a precursor is uniformly promoted to suppress the elution amount of a lithium compound (mainly lithium carbonate) in a manufacturing method for obtaining a fired powder using a rotary furnace (rotary kiln).

Solution to Problem

A method for manufacturing a positive electrode active material for a lithium ion secondary battery of the present invention having a mixing step of mixing a lithium compound and a compound containing a metal element other than Li in the following formula (1) to obtain a powder mixture, a first heat treatment step of thermally treating the powder mixture to obtain a precursor, a second heat treatment step of thermally treating the precursor to obtain a fired powder and a third heat treatment step of thermally treating the fired powder to obtain a lithium complex compound represented by the following formula (1), in which 95 mass % or more of the lithium compound is reacted in the second heat treatment step having a batch firing process for heating the precursor while rolling the same in a heating region in a furnace tube, and the batch firing process has a tilted input stage for tilting the furnace tube and inputting the precursor from an inlet of the firing furnace, a horizontal firing stage for performing firing while making the furnace tube horizontal, and a tilted discharge stage for tilting the furnace tube and discharging the fired powder from an outlet of the firing furnace.

$$Li_{1+a}M1O_{2+\alpha} \quad (1)$$

(Here, in the formula (1), M1 is the metal element other than Li and includes at least Ni, a proportion of the Ni in M1 is 70 atom % or more and a and $\alpha$ are numbers satisfying $-0.1 \le a \le 0.2$ and $-0.2 \le \alpha \le 0.2$.)

In the method for manufacturing a positive electrode active material for a lithium ion secondary battery of the present invention, the furnace tube includes a supply-side spiral blade from the inlet to the heating region and a discharge-side spiral blade from the heating region to the outlet, and, in the batch firing process, the precursor is collected in the heating region.

In addition, the furnace tube includes a supply-side spiral blade from the inlet to an inlet of the heating region, includes a lifter in the heating region and, additionally, includes a discharge-side spiral blade from an outlet of the heating region to the outlet, and a height of the lifter is lower than heights of the supply-side spiral blade and/or the discharge-side spiral blade, thereby firing the precursor present in the heating region while circulating the same.

In the method for manufacturing a positive electrode active material for a lithium ion secondary battery of the present invention, the lifter in the heating region is preferably a spiral blade.

In addition, in the method for manufacturing a positive electrode active material for a lithium ion secondary battery of the present invention, rotation speeds of the furnace tube in the tilted input stage and/or the tilted discharge stage are preferably set to be higher than a rotation speed of the furnace tube in the horizontal firing stage.

In the method for manufacturing a positive electrode active material for a lithium ion secondary battery of the present invention, the formula (1) is represented by the following formula (2), an average particle diameter of a slurry in the mixing step is set to 0.1 μm or more and 0.5 μm or less, an average particle diameter of secondary particles in a granulated powder obtained by granulating the slurry is set to 5 μm or more and 20 μm or less, the first heat treatment step thermally treat s the granulated powder at a heat treatment temperature of 200° C. or higher and 500° C. or lower for 0.5 hours or longer and five hours or shorter to obtain a precursor, the second heat treatment step thermally treat s the precursor at a heat treatment temperature of 600° C. or higher and lower than 750° C. for 10 hours or longer and 100 hours or shorter in an oxidizing atmosphere to obtain a fired powder, and the third heat treatment step thermally treat s the fired powder at a heat treatment temperature of 750° C. or higher and 900° C. or lower for 0.5 hours or longer and 50 hours or shorter in an oxidizing atmosphere to obtain a lithium complex compound.

$$Li_{1+a}Ni_bCo_cM_dX_eO_{2+\alpha} \quad (2)$$

[Here, in the formula (2), M represents at least one selected from Al and Mn, X represents at least one metal element other than Li, Ni, Co, Al and Mn, and a, b, c, d, e and a are numbers satisfying $-0.1 \le a \le 0.2$, $0.7 \le b \le 1.0$, $0 \le c \le 0.20$, $0 \le d \le 0.20$, $0 \le e \le 0.20$, $b+c+d+e=1$, and $-0.2 < \alpha << 0.2$, respectively.]

Advantageous Effects of Invention

According to the present invention, it is possible to provide a method for manufacturing a positive electrode active material for a lithium ion secondary battery in which the solid-phase reaction of a precursor is uniformly promoted to suppress the elution amount of a lithium compound (mainly lithium carbonate) in a manufacturing method for obtaining a fired powder using a rotary furnace (rotary kiln).

DESCRIPTION OF EMBODIMENTS

Figure 1:
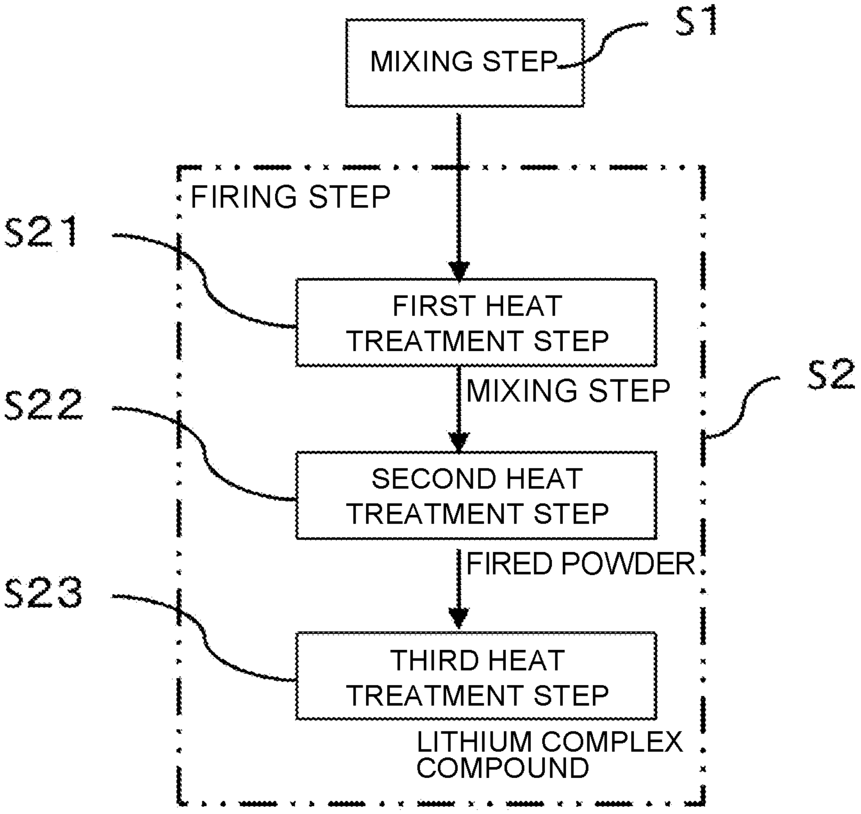
FIG. 1 is a flowchart showing an example of a method for manufacturing a positive electrode active material for a lithium ion secondary battery according to an embodiment of the present invention.

Hereinafter, a method for manufacturing a positive electrode active material for a lithium ion secondary battery of the present invention will be described in detail. First, a positive electrode active material and a method for manufacturing a positive electrode active material for a lithium ion secondary battery (hereinafter, simply referred to as the method for manufacturing a positive electrode active material) according to one embodiment will be described, and then a batch firing process will be additionally described. In the present invention, a powder mixture after moisture removal and before firing will be referred to as a precursor, the precursor fired in a furnace will be referred to as a fired powder, and an active material obtained after all firing steps will be referred to as a lithium complex compound. In addition, a configuration common in each of the following drawings will be given the same reference sign and will not be described again.

Conventionally, in firing using a rotary kiln, continuous firing is performed by making a precursor input into the inside of the rotary kiln advance while rolling the same. At this time, oxygen is caused to flow from the outlet side toward the inlet side to enhance a firing reaction, but the carbon dioxide concentration becomes high at the inlet side, and a concentration difference is caused in the furnace. The amount of unreacted lithium carbonate increases due to the carbon dioxide concentration difference, and, as a result, it becomes impossible to reduce the amount of lithium carbonate remaining in a fired powder to a reference value or less. When an attempt is made to reduce the amount of lithium carbonate to the reference value or less, there is a need to extend the firing time, which is not preferable in terms of process steps. Therefore, in the present invention, a rotary kiln is used in a second heat treatment step where a reaction of a lithium compound is most promoted, that is, a step of obtaining the fired powder from the precursor. At this time, batch firing process accompanying input, firing and discharge is performed by inputting the precursor into the furnace, collecting and firing the precursor in a heating region and discharging the fired powder, whereby the reaction rate of the lithium compound increases. Furthermore, a supply-side spiral blade is provided from the inlet to the heating region, and a discharge-side spiral blade is provided from the heating region to the outlet, which makes it easy to collect the precursor in the central heating region by the rotation of these spiral blades. Furthermore, the height of a lifter (stirring blade) present in the heating region is lower than the heights of the supply-side spiral blade and the discharge-side spiral blade, which makes it possible to circulate the precursor present in the heating region in the axial direction in the heating region to increase the efficiency of a reaction. Therefore, it is possible to move the fired powder in a region with a high carbon dioxide concentration to a region with a low carbon dioxide concentration, and it becomes possible to fire all of a powder mixture in the region with a low carbon dioxide concentration. As a result, unreacted lithium carbonate can be reduced, and a solid-phase reaction is uniformly promoted. This makes it possible to effectively reduce the amount of the unreacted lithium carbonate and to maintain productivity.

[Positive Electrode Active Material]

A positive electrode active material according to the present embodiment is composed of a lithium complex oxide that has an $\alpha$-$NaFeO_2$ type crystal structure as a crystal structure and contains lithium and a transition metal (hereinafter, referred to as the lithium complex compound). A main phase of the positive electrode active material is a lithium complex compound having a layered structure. However, depending on manufacturing conditions, the positive electrode active material may contain lithium carbonate as an inevitable impurity as described below. Lithium carbonate can be present in a state of having formed a foreign phase or in a state of adhering to the particles of the positive electrode active material.

The positive electrode active material according to the present embodiment is represented by the following formula (1)

$$Li_{1+a}M1O_{2+\alpha} \quad (1)$$

(here, in the formula (1). M1 is the metal element other than Li and includes at least Ni, a proportion of the Ni in M1 is 70 atom % or more and a and $\alpha$ are numbers satisfying $-0.1 \le a \le 0.2$ and $-0.2 \le \alpha \le 0.2$).

The positive electrode active material according to the present embodiment has a composition in which the proportion of nickel (Ni) per the metal element (M1) other than lithium (Li) is 70 atom % or more and is thereby a positive electrode active material capable of realizing a high energy density or a high charge and discharge capacity. As the proportion of nickel (Ni) per the metal element (M1) other than lithium (Li), it is possible to have an appropriate value in a range of 70 atom % or more and 100 atom % or less. Since the positive electrode active material contains nickel in a high proportion as described above, it is important for an oxidation reaction where $Ni^{2+}$ is oxidized into $Ni^{3+}$ to be efficiently performed.

A more preferable specific composition of the positive electrode active material according to the present embodiment is represented by the following formula (2):

$$Li_{1+a}Ni_bCo_cM_dX_eO_{2+\alpha} \quad (2)$$

[here, in the formula (2), M represents at least one selected from Al and Mn, X represents at least one metal element other than Li, Ni, Co, Al and Mn, and a, b, c, d, e and a are numbers satisfying $-0.1 \le a \le 0.2$, $0.7 \le b \le 1.0$, $0 \le c \le 0.20$, $0 \le d \le 0.20$, $0 \le e \le 0.20$, $b+c+d+e=1$ and $-0.2 < \alpha < 0.2$.].

The positive electrode active material represented by the formula (2) has a high nickel content rate and is thus capable of exhibiting a high charge and discharge capacity in a range of up to near 4.3 V compared with $LiCoO_2$ and the like. In addition, since the nickel content rate is high, for the positive electrode active material, the raw material cost is inexpensive, and the raw material is easy to procure compared with $LiCoO_2$ and the like.

Here, the meanings of the numerical ranges of a, b, c, d, e and a in the formulae (1) and (2) will be described.

a in the formula is set to −0.1 or more and 0.2 or less, a represents an excess or deficiency of lithium from the stoichiometric ratio of the lithium complex compound represented by a general formula: $LiM1O_2$, that is, Li:M1:O=1:

1:2. When the amount of lithium is excessively small, the charge and discharge capacity of the positive electrode active material becomes low. On the other hand, when the amount of lithium is excessively large, the charge and discharge cycle characteristics deteriorate. When a is within the above-described numerical range, it is possible to satisfy both a high charge and discharge capacity and favorable charge and discharge cycle characteristics, a may be set to −0.02 or more and 0.05 or less. When a is −0.02 or more, since the amount of lithium secured is large enough to contribute to charging and discharging, it is possible to increase the charge and discharge capacity of the positive electrode active material. In addition, when a is 0.05 or less, since charge compensation is sufficiently made by a valence change in the transition metal, it is possible to satisfy both a high charge and discharge capacity and favorable charge and discharge cycle characteristics.

The coefficient b of nickel is set to 0.7 or more and 1.0 or less. When b is 0.7 or more, a sufficiently high charge and discharge capacity can be obtained compared with a case where other transition metals are used. Therefore, when b is within the above-described numerical range, it is possible to manufacture a positive electrode active material exhibiting a high charge and discharge capacity at a low cost compared with $LiCoO_2$ and the like.

b is preferably set to 0.8 or more and 0.95 or less and more preferably set to 0.85 or more and 0.95 or less. When b is 0.8 or more, as b becomes larger, a higher charge and discharge capacity can be obtained. In addition, when b is 0.95 or less, as b becomes smaller, lattice distortion or a change in the crystal structure in association with the intercalation or deintercalation of lithium ions is reduced, and, during firing, cation mixing, which is the entry of nickel into lithium sites, or the deterioration of the crystallinity is less likely to be caused, and thus the deterioration of the charge and discharge capacity or the charge and discharge cycle characteristics is suppressed.

The coefficient c of cobalt is set to 0 or more and 0.20 or less. When cobalt has been added, the crystal structure is stabilized, and an effect of suppressing cation mixing, which is the entry of nickel into lithium sites, or the like can be obtained. Therefore, it is possible to improve the charge and discharge cycle characteristics without significantly impairing the charge and discharge capacity. On the other hand, when there is an excess of cobalt, since the raw material cost becomes high, the manufacturing cost of the positive electrode active material increases. When c is within the above-described numerical range, it is possible to satisfy both a high charge and discharge capacity and favorable charge and discharge cycle characteristics with favorable productivity.

c may be set to 0.01 or more and 0.20 or less and may be set to 0.03 or more and 0.20 or less. When c is 0.01 or more, as c becomes larger, an effect of element substitution of cobalt can be more sufficiently obtained, and the charge and discharge cycle characteristics further improve. In addition, when c is 0.20 or less, the raw material cost becomes more inexpensive, and the productivity of the positive electrode active material becomes more favorable.

The coefficient d of M is set to 0 or more and 0.20 or less. When at least one element (M) selected from the group consisting of manganese and aluminum is element-substituted, even in a case where lithium is deintercalated by charging, the layered structure is more stably preserved. On the other hand, when there is an excess of this element (M), the proportion of other transition metals such as nickel becomes low, and the charge and discharge capacity of the positive electrode active material decreases. When d is within the above-described range, the crystal structure of the positive electrode active material is stably preserved, and it is possible to obtain favorable charge and discharge cycle characteristics, thermal stability or the like together with a high charge and discharge capacity.

As the element represented by M, manganese or aluminum is preferable. Such an element contributes to stabilizing the crystal structures of positive electrode materials having a high nickel content. Particularly, manganese is particularly preferable. When manganese is element-substituted, a higher charge and discharge capacity can be obtained compared with a case where aluminum is element-substituted. In addition, during the firing of the lithium complex compound, manganese also reacts with lithium carbonate as shown in the following formula (3). Such a reaction suppresses the coarsening of crystal grains, and, since it is possible to make the oxidation reaction of nickel progress at a high temperature, a positive electrode active material exhibiting a high charge and discharge capacity can be efficiently obtained.

$$Li_2Co_3+2M'O+0.5O_2 \rightarrow 2LiM'O_2+CO_2 \quad (3)$$

(Here, in the formula (3), M' represents a metal element such as Ni, Co or Mn.)

The coefficient d of M is preferably 0.02 or more and more preferably 0.04 or more. As the coefficient d of M becomes larger, an effect of element substitution of manganese can be more sufficiently obtained. That is, it becomes possible to make the oxidation reaction of nickel progress at a higher temperature, and a positive electrode active material exhibiting a high charge and discharge capacity can be more efficiently obtained. In addition, the coefficient d of M is preferably 0.18 or less. When the coefficient d of M is 0.18 or less, even in a case where M is element-substituted, a high charge and discharge capacity is preserved.

The coefficient e of X is set to 0 or more and 0.20 or less. X represents one or more metal elements other than Li, Ni, Co, Al and Mn; however, when at least one element selected from the group consisting of magnesium, titanium, zirconium, molybdenum and niobium has been element-substituted, it is possible to improve a variety of performances such as charge and discharge cycle characteristics while the activity of the positive electrode active material is maintained. On the other hand, when there is an excess of this element (X), the proportion of other transition metals such as nickel becomes low, and the charge and discharge capacity of the positive electrode active material decreases. When e is within the above-described numerical range, it is possible to satisfy all of a high charge and discharge capacity, favorable charge and discharge cycle characteristics and the like.

$\alpha$ in the formulae (1) and (2) is set to −0.2 or more and 0.2 or less. $\alpha$ represents an excess or deficiency of oxygen from the stoichiometric ratio of the lithium complex compound represented by a general formula: $LiM'O_2$, that is. Li:M':O=1:1:2. When a is within the above-described numerical range, the number of defects in the crystal structure is small, and a high charge and discharge capacity and favorable charge and discharge cycle characteristics can be obtained.

[Method for Manufacturing Positive Electrode Active Material]

Next, a method for manufacturing the positive electrode active material will be described. The positive electrode active material can be manufactured according to an ordinary method for manufacturing a positive electrode active material, for example, a solid-phase method, a co-precipitation method, a sol-gel method, a hydrothermal method or the like. Among these methods, the present invention is synthesized by the solid-phase method using a lithium compound as a raw material. Examples of compounds containing lithium include lithium carbonate, lithium acetate, lithium nitrate, lithium hydroxide, lithium chloride, lithium sulfate and the like. Among these, lithium carbonate is preferably used, and the proportion of lithium carbonate used in the raw material containing lithium is more preferably 80 mass % or more. Compared with other compounds containing lithium, lithium carbonate has excellent supply stability and is inexpensive and thus can be easily procured. In addition, lithium carbonate is weakly alkaline and thus causes less damage to manufacturing devices and is excellent in terms of industrial availability and practicality. Hereinafter, a manufacturing method in which lithium carbonate is used will be described.

FIG. 1 is a flowchart showing an example of a method for manufacturing a positive electrode active material according to one embodiment of the present invention. As shown in FIG. 1, the method for manufacturing a positive electrode active material according to the present embodiment has a mixing step S1 and a firing step S2. The lithium complex compound represented by the formulae (1) and (2) is synthesized by these steps. Hereinafter, the case of the formula (2) will be described as an example.

In the mixing step S1, lithium carbonate and a compound containing a metal element other than Li in the formula (2) are mixed together. That is, as raw materials of the positive electrode active material, lithium carbonate and a nickel compound containing nickel are mixed together. In addition, in a case where the lithium complex compound represented by the formula (2) contains cobalt, the element represented by M or the element represented by X, a compound containing the corresponding element is added and mixed.

In the mixing step S1, at least lithium carbonate is used as the raw material containing lithium. As described above, lithium carbonate is inexpensive, can be easily procured, causes less damage to manufacturing devices and is thus preferable. In addition, lithium carbonate has a relatively high melting point, which makes it possible to avoid the formation of a liquid phase and the coarsening of crystal grains during synthesis by the solid-phase method.

In the mixing step S1, as a raw material containing nickel, it is possible to use nickel compounds such as nickel hydroxide, nickel carbonate, nickel oxide, nickel sulfate and nickel acetate. Among these, particularly, nickel hydroxide, nickel carbonate or nickel oxide is preferably used as the nickel compound.

In the mixing step S1, as a cobalt compound containing cobalt, a metal compound containing the element represented by M or a metal compound containing the element represented by X, nitrates, carbonates, sulfates, acetates, oxides, hydroxides and the like can be used. Among these, particularly, carbonates, oxides or hydroxides are preferably used.

In the mixing step S1, the raw materials, such as lithium carbonate, are each weighed, crushed and mixed together, thereby obtaining a powdery powder mixture. As a crusher that crushes the raw materials, it is possible to use an ordinary precise crusher, for example, a ball mill, a jet mill, a sand mill or the like. The crushing of the raw materials may be any of dry crushing and wet crushing. A raw material slurry obtained by wet-type crushing can be dried using a variety of dryers, for example, a spray dryer, a fluid bed dryer, an evaporator and the like.

In the mixing step S1, the raw materials, such as lithium carbonate, are preferably crushed so that the average particle diameter reaches 0.5 μm or less, the average particle diameter of the slurry is set to 0.1 μm or more and 0.3 μm or less, and the slurry is preferably crushed so that the average particle diameter reaches 0.2 μm or less. When the raw materials have been crushed to such fine particle diameters, the reactivity between lithium carbonate and the nickel compound or the like improves, and the deintercalation of a component such as carbon dioxide from the raw materials, such as lithium carbonate, becomes easy. In addition, the degree of mixing of the crushed products becomes high, firing is likely to progress uniformly, and it becomes possible to easily control the average particle diameter of the primary particles of the lithium complex compound to be within an appropriate range.

In the mixing step S1, it is preferable that the slurry is prepared by mixing by wet crushing and the obtained slurry is granulated by spray drying. When the raw materials, such as lithium carbonate, are wet-crushed and mixed together in a medium such as water and the obtained slurry is granulated by spray drying, after firing, the average particle diameter of secondary particles has been controlled, and it is possible to stably obtain secondary particles having an aspect ratio close to one. As a spray dryer, it is possible to use a variety of types such as two-fluid nozzle type, four-fluid nozzle type, disc type and the like.

The average particle diameter of the secondary particles that are granulated by spray drying is preferably set to 5 μm or more and 25 μm or less and more preferably set to 5 μm or more and 20 μm or less. When the secondary particles are granulated up to such particle diameters, it is possible to easily make the secondary particles of the lithium complex compound that is obtained after firing have an average particle diameter within an intended range. The average particle diameter of the secondary particles can be controlled by, for example, adjusting the concentration of the slurry, the viscosity of the slurry, the amount of the slurry sprayed, the dispersity of a suspended matter, the spraying temperature, the spraying pressure, the air blowing velocity or the like.

In the firing step S2, the powder mixture before firing obtained by the mixing step S1 is fired to obtain the lithium complex compound represented by the formula (2). In the firing step S2, the powder mixture on which an appropriate treatment such as spray granulation has been performed after the mixing step S1 is fired under predetermined conditions, whereby a lithium complex compound having a layered structure is formed. The firing step S2 may be performed by one stage of heat treatment for which the heat treatment temperature is controlled in a certain range or may be performed by a plurality of stages of heat treatments for which the heat treatment temperatures are controlled in different ranges.

The firing step S2 preferably has a first heat treatment step S21, a second heat treatment step S22 and a third heat treatment step S23 as shown in FIG. 1. When such a plurality of stages of heat treatments are performed, it is possible to significantly reduce the amount of lithium carbonate remaining in the lithium complex compound at the time of the end of firing while the particle diameters of the lithium complex compound are grown to be within an appropriate range by adjusting the heat treatment temperature, the heat treatment time, the atmosphere or the like, and thus it is possible to satisfy all of a high charge and discharge capacity, favorable charge and discharge cycle characteristics and the like.

In the first heat treatment step S21, the powder mixture obtained in the mixing step S1 is thermally treated at a heat treatment temperature of 200° C. or higher and 500° C. or lower for 0.5 hours or longer and five hours or shorter to obtain a precursor. The first heat treatment step S21 is performed for the main purpose of removing moisture or the like that hinders a synthesis reaction of the lithium complex compound from the powder mixture obtained in the mixing step S1. The conditions of the first heat treatment step can be replaced as long as such a purpose can be achieved in the step. The first heat treatment step can be optionally performed.

In the first heat treatment step S21, when the heat treatment temperature is 200° C. or higher, a combustion reaction of an impurity, the thermal decomposition of the raw materials, or the like sufficiently progresses, and thus it is possible to suppress the formation of a foreign phase or the like that is inactive in the subsequent heat treatments. In addition, when the heat treatment temperature is 500° C. or lower, the crystals of the lithium complex compound are rarely formed in this step, and thus it is possible to prevent the formation of a crystal phase having a low purity in the presence of a gas containing moisture, an impurity or the like.

The heat treatment temperature in the first heat treatment step S21 is preferably 250° C. or higher and 400° C. or lower and more preferably 250° C. or higher and 380° C. or lower. When the heat treatment temperature is within this range, moisture, an impurity or the like is efficiently removed, and it is possible to reliably prevent the formation of the crystals of the lithium complex compound in this step. The heat treatment time in the first heat treatment step S21 can be set to an appropriate time depending on, for example, the heat treatment temperature, the amount of moisture, an impurity or the like contained in the powder mixture, the purpose of the removal of moisture, an impurity, or the like, the degree of crystallization or the like.

The first heat treatment step S21 is preferably performed under the stream of an atmospheric gas or under the evacuation of air with a pump. When the heat treatment is performed under such an atmosphere, it is possible to efficiently exclude the gas containing moisture, an impurity or the like. The flow rate of the stream of the atmospheric gas or the amount of an air evacuated per time with the pump is preferably greater than the volume of a gas that is generated from the powder mixture. The volume of the gas that is generated from the powder mixture can be obtained based on, for example, the amount of the raw materials used, the mole ratio of a component that gasifies by combustion or thermal decomposition to the raw materials or the like.

The first heat treatment step S21 may be performed under an oxidizing gas atmosphere, may be performed under a non-oxidizing gas atmosphere or may be performed under a reduced-pressure atmosphere. The oxidizing gas atmosphere may be any of an oxygen gas atmosphere and the atmospheric atmosphere. In addition, the reduced-pressure atmosphere may be, for example, a reduced-pressure condition with an appropriate degree of vacuum such as the atmospheric pressure or lower.

In the second heat treatment step S22, the precursor obtained in the first heat treatment step S21 is thermally treated at a heat treatment temperature of 600° C. or higher and lower than 750° C. for 10 hours or longer and 100 hours or shorter to obtain a fired powder. The second heat treatment step S22 is performed for the main purpose of removing a carbonate component by a reaction between lithium carbonate and the nickel compound or the like, oxidizing divalent nickel to be trivalent and generating the crystals of the lithium complex compound.

In the second heat treatment step S22, 95 mass % or more of lithium carbonate input as the raw material is reacted. 97 mass % or more of lithium carbonate is preferably reacted and 98 mass % or more of lithium carbonate is more preferably reacted. When the reaction of lithium carbonate is insufficient, and the oxidation of nickel is not sufficient, lithium sites are likely to be substituted with divalent nickel, and there is a concern that the charge and discharge capacity of the positive electrode active material may decrease. In addition, when a large amount of lithium carbonate remains at the time of the end of the second heat treatment step S22, carbon dioxide is discharged into the atmosphere of the third heat treatment step S23 to inhibit the reaction that generates the crystals or cause the carbonate component incorporated into the crystals of the lithium complex compound, and there is a concern that the particle breaking strength or the charge and discharge capacity may decrease. In contrast, when the majority of lithium carbonate is reacted in the second heat treatment step S22, it is possible to form a lithium complex compound exhibiting a high charge and discharge capacity after the third heat treatment step S23.

In addition, when the reaction of lithium carbonate is insufficient, and a large amount of lithium carbonate remains at the time of the end of the second heat treatment step S22, there is a possibility that lithium carbonate may melt and form a liquid phase in the third heat treatment step S23. When the lithium complex compound is fired in the liquid phase, the crystal grains coarsen, and there is a concern that the output characteristics of lithium ion secondary batteries may deteriorate. In contrast, when the majority of lithium carbonate is reacted in the second heat treatment step S22, the generation of a liquid phase in the third heat treatment step S23 becomes very few, and thus it becomes difficult for the crystal grains of the lithium complex compound to become coarse even when the heat treatment temperature is increased. Therefore, it is possible to make the oxidation of nickel progress at a high temperature while the output characteristics of lithium ion secondary batteries are secured and fire the lithium complex compound exhibiting a high charge and discharge capacity.

In the second heat treatment step S22, when the heat treatment temperature is 600° C. or higher, since the formation of a layered structure progresses by the reaction between lithium carbonate and the nickel compound or the like, it is possible to prevent the remaining of unreacted lithium carbonate. Therefore, in the subsequent heat treatment, the generation of a liquid phase becomes very few for lithium carbonate, the coarsening of the crystal grains is suppressed, and a positive electrode active material exhibiting a high particle breaking strength or charge and discharge capacity can be obtained. In addition, when the heat treatment temperature is lower than 750° C., grain growth does not progress excessively, and thus the charge and discharge capacity of the positive electrode active material becomes high.

The heat treatment temperature in the second heat treatment step S22 is preferably 650° C. or higher. As the heat treatment temperature becomes higher as described above, the reaction of lithium carbonate is further promoted, and the remaining of lithium carbonate is more reliably prevented. Particular, when, as the element represented by M in the formula (2), manganese is element-substituted, in a case where the coefficient d of manganese exceeds 0 and less than 0.075, the heat treatment temperature is preferably set to 600° C. or higher. On the other hand, when the coefficient d of manganese is 0.075 or more, the reaction temperature decreases, and thus the heat treatment temperature is preferably set to 550° C. or higher.

The heat treatment temperature in the second heat treatment step S22 is preferably 700° C. or lower and more preferably 680° C. or lower. As the heat treatment temperature becomes lower as described above, grain growth is further suppressed, and thus the charge and discharge capacity of the positive electrode active material becomes high. In addition, the melting of lithium carbonate becomes difficult, and the formation of a liquid phase becomes difficult, and thus it is possible to more reliably suppress the coarsening of the crystal grains.

The heat treatment time in the second heat treatment step S22 is preferably set to 10 hours or longer and 50 hours or shorter and more preferably set to 20 hours or longer and 30 hours or shorter. When the heat treatment time is within this range, since the reaction of lithium carbonate sufficiently progresses, it is possible to reliably remove the carbonate component. In addition, the necessary time for the heat treatment is shortened, and the productivity of the positive electrode active material improves.

The second heat treatment step S22 is preferably performed in an oxidizing atmosphere. The oxygen concentration in the atmosphere is preferably set to 80% or more, more preferably 90% or more, still more preferably 95% or more and particularly preferably set to 100%. In addition, the carbon dioxide concentration in the atmosphere is preferably set to 5% or less, more preferably set to 1% or less and still more preferably set to 0.1% or less. In addition, the second heat treatment step S22 is preferably performed under the stream of an oxidizing gas. When the heat treatment is performed under the stream of an oxidizing gas, it is possible to reliably oxidize nickel and to reliably exclude carbon dioxide emitted into the atmosphere. The second heat treatment step S22 may be performed a plurality of times as a calcination step.

In the third heat treatment step S23, the fired powder obtained in the second heat treatment step S22 is thermally treated at a heat treatment temperature of 750° C. or higher and 900° C. or lower for 0.5 hours or longer and 50 hours or shorter to obtain a lithium complex compound. The third heat treatment step S23 is performed for the main purpose of sufficiently oxidizing divalent nickel in the fired powder to be trivalent and growing the crystal grains of a lithium complex compound having a lamellar structure up to an appropriate size.

When the heat treatment temperature is 750° C. or higher in the third heat treatment step S23, since nickel sufficiently oxidizes to grow the primary particles to an appropriate particle diameter, a lithium complex compound having a high crystallinity and a low open pore volume rate is fired. Therefore, the amounts of lithium carbonate remaining during firing and incorporated after firing become small, it is possible to obtain a positive electrode active material having a high charge and discharge capacity. In addition, when the heat treatment temperature is 900° C. or lower, since lithium is less likely to volatilize, and the decomposition of the lithium complex compound having a layered structure is suppressed, it is possible to avoid a decrease in the purity of crystals to be obtained after firing and a consequent decrease in the charge and discharge capacity.

The heat treatment temperature in the third heat treatment step S23 is preferably 800° C. or higher, more preferably 840° C. or higher and still more preferably 850° C. or higher. As the heat treatment temperature becomes higher as described above, nickel is more reliably oxidized, and it is possible to further promote the grain growth of the lithium complex compound.

The heat treatment temperature in the third heat treatment step S23 is preferably 890° C. or lower. As the heat treatment temperature becomes lower as described above, since the volatilization of lithium becomes more difficult, it is possible to obtain a lithium complex compound exhibiting a high charge and discharge capacity by more reliably preventing the decomposition of the lithium complex compound having a layered structure.

The heat treatment time in the third heat treatment step S23 is preferably set to 0.5 hours or longer and 15 hours or shorter. When the heat treatment time is within this range, nickel sufficiently oxidizes, and a lithium complex compound having a high crystallinity and exhibiting a high charge and discharge capacity can be obtained. In addition, the necessary time for the heat treatment is shortened, and the productivity of the positive electrode active material improves.

The third heat treatment step S23 is preferably performed in an oxidizing atmosphere. The oxygen concentration in the atmosphere is preferably set to 80% or more, more preferably 90% or more, still more preferably 95% or more and particularly preferably set to 100%. In addition, the carbon dioxide concentration in the atmosphere is preferably set to 5% or less, more preferably set to 1% or less and still more preferably set to 0.1% or less. In addition, the third heat treatment step S23 is preferably performed under the stream of an oxidizing gas. When the heat treatment is performed under the stream of an oxidizing gas, it is possible to reliably oxidize nickel and to reliably exclude carbon dioxide emitted into the atmosphere. The third heat treatment step S23 is preferably performed once as a main firing step, but may be performed a plurality of times.

The lithium complex compound represented by the formula (2) is obtained by the above-described mixing step S1 and firing step S2. The lithium complex compound may be classified as necessary so that the average particle diameter of the secondary particles becomes appropriate.

In the firing step S2, as a firing furnace for the heat treatments, it is possible to use an appropriate heating device such as a rotary furnace such as a rotary kiln, a continuous furnace such as a roller hearth kiln, a tunnel furnace, or a pusher furnace, or a batch furnace. The first heat treatment step S21, the second heat treatment step S22 and the third heat treatment step S23 may be performed using the same heating device or may be performed using different heating devices. In addition, each heat treatment step may be performed intermittently by switching atmospheres or may be performed continuously in a case where the heat treatment is performed while the gas in the atmosphere is evacuated. However, in the present invention, the firing step of the above-described second heat treatment step S22 is performed using a rotary furnace such as a rotary kiln. Hereinafter, the batch firing process in which a rotary kiln is used will be described.

[Batch Firing Process]

Figure 2:
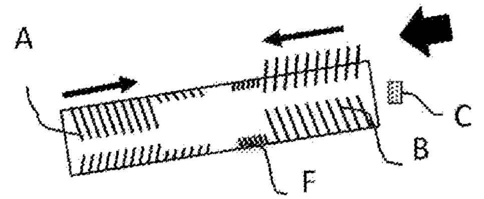
FIG. 2 is a schematic view for describing a batch firing process in the method for manufacturing a positive electrode active material for a lithium ion secondary battery of the present invention. (a) of FIG. 2 shows a tilted input stage, (b) of FIG. 2 shows a horizontal firing stage and (c) of FIG. 2 shows a tilted discharge stage.
Figure 2:
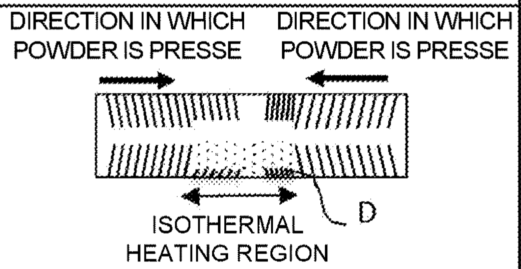
Figure 2:
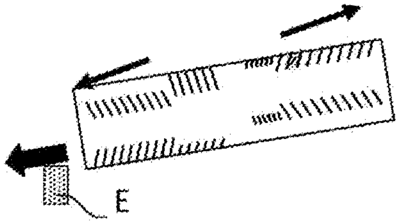

A rotary kiln has a furnace tube that can be rotated and tilted, an inlet through which a precursor is supplied and an outlet through which a fired powder after a heat treatment is discharged. Normally, in the rotary kiln, a powder is fired while being caused to roll and advance by rotating the furnace tube in a tilted state. In the present invention, a batch type process where the securement of the holding time of a fired powder and input and discharge operations are separately performed is adopted in the rotary kiln, and, in the present invention, this will be referred to as the batch firing process. As shown in FIG. 2, this firing process is composed of a tilted input stage (a) for putting the furnace into a tilted state and inputting the precursor into a heating region, a horizontal firing stage (b) for putting the furnace into a horizontal state and evenly firing the precursor while holding the precursor in the heating region in the furnace for a long period of time and a tilted discharge stage (c) for putting the furnace into a tilted state and discharging a fired powder that has undergone a firing reaction.

In the tilted input stage, the precursor (powder mixture) is input into the furnace tube of the rotary kiln. In the furnace tube, there is a heating region in the central part of the furnace, a discharge-side spiral blade is provided from the central part to the outlet of the furnace, a supply-side spiral blade is provided from the central part to the inlet of the furnace, and mutually opposite spiral grooves are formed in the supply-side spiral blade and the discharge-side spiral blade. Therefore, when the discharge-side spiral blade and the supply-side spiral blade are rotated, the spiral grooves rotate in mutually opposite direction, respectively, which makes it possible to move powders in the spiral grooves in mutually opposite directions. Here, it is possible to gather the input precursor in the heating region in the central part of the furnace, that is, move and collect the precursor in the heating region by rotating the supply-side spiral blade and the discharge-side spiral blade in the forward direction.

In the horizontal firing stage, the furnace tube is put into a horizontal state where the tilt angle of the furnace tube is zero degrees and rotated in the forward direction at a rotation speed of about 1 to 3 rpm, and heating and firing are started. When the rotation direction of the furnace tube has been set to the forward rotation direction and the rotation speed has been set to about 1 rpm, it is possible to fire a fired powder in a state of being held in the heating region while rolling the precursor by performing the firing for a firing time of about 15 to 50 hours.

In the tilted discharge stage, after the batch firing process is performed for a predetermined time in the horizontal firing stage, the tilt angle of the furnace tube is changed to, for example, three degrees, and, furthermore, the rotation direction of the discharge-side spiral blade and the supply-side spiral blade is changed from forward rotation to the reverse rotation direction. Therefore, the spiral grooves rotate in mutually opposite direction, respectively, and the fired powder in the furnace is moved toward the outlet and discharged with the discharge-side spiral blade. Incidentally, the tilt angle of the rotary kiln can be set to, for example, about one to five degrees and preferably set to two to three degrees, and the fired powder that has reached the outlet can be taken out within a shorter period of time by setting the tilt angle to be steeper. At this time, it is also possible to set a high rotation speed.

Figure 4:
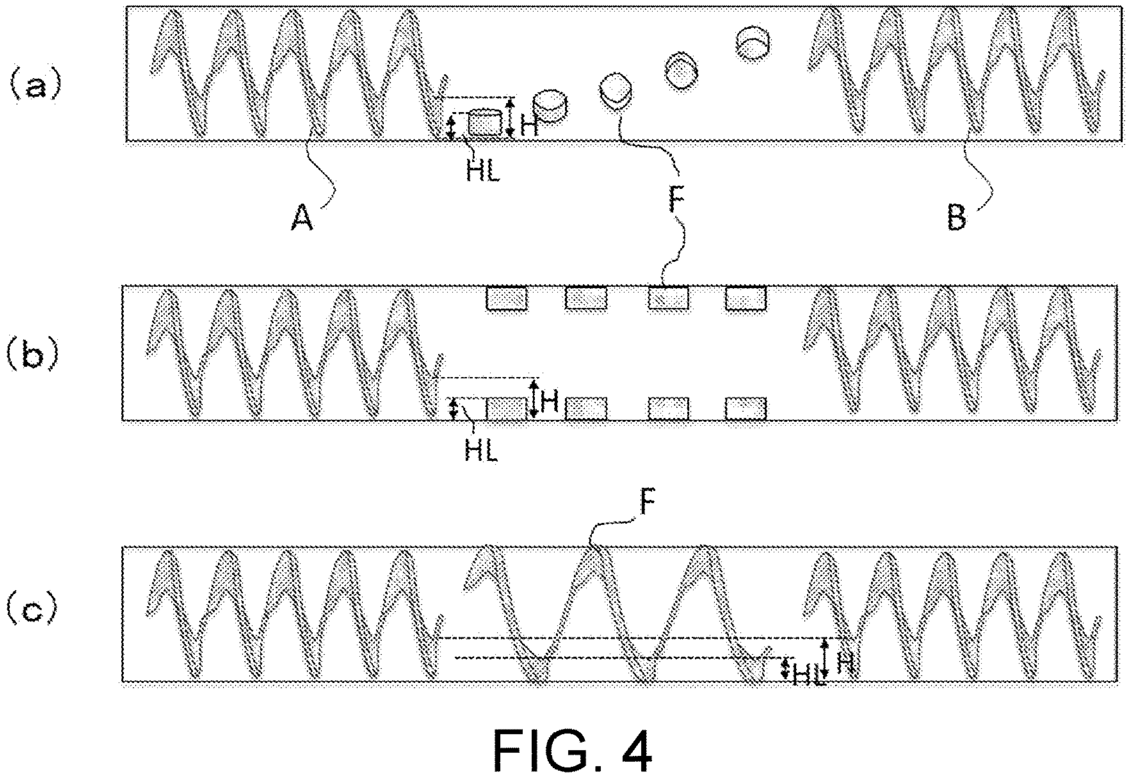
FIG. 4 is a view showing a configuration example of a lifter.

In the supply-side spiral blade and the discharge-side spiral blade, as described above, mutually opposite spiral grooves are formed. In addition, as a lifter present in the heating region, there is a configuration example as shown in FIG. 4. (a) of FIG. 4 is an example where a cylindrical protruding piece is disposed in a spiral shape, (b) of FIG. 4 is an example where cylindrical protruding pieces are disposed in the axial direction and in the radial direction, and (c) of FIG. 4 is an example where the lifter has a spiral blade shape. In all of the examples, the height HL of the lifter F is lower than the heights H of the blades in other outside regions. This is because the blades in regions other than the heating region are required to hold the fired powder in the heating region and thus the supply-side and discharge-side spiral blades in regions other than the heating region need to be higher than the height of the fired powder filled to suppress the escape of the fired powder to the outside of the heating region. Incidentally, since it is important to circulate the fired powder in the heating region, a lifter having a stirring action (stirring blade) is used. The lifter does not need to be tall, and, when the lifter is made rather low to have a shape easy to rake up the fired powder little by little, it is possible to fire the precursor present in the heating region while circulating the precursor in the longitudinal direction in the heating region.

During firing, the oxygen concentration in the heating region becomes higher on the discharge side than on the supply side, and thus, in the case of being not circulated, the fired powder is fired in the heating region in a state where the oxygen concentration is not uniform at all times. As a result, a fired powder in which the degree of progress of the solid-phase reaction of the fired powder is not uniform on the supply side and the discharge side is likely to be produced. On the other hand, in a case where the fired powder is circulated, it is possible to move the fired powder in a region with a low oxygen concentration to a region with a high oxygen concentration, and it becomes possible to fire all of the powder mixture in the region with a high oxygen concentration (with a low carbon dioxide concentration). As a result, unreacted lithium carbonate can be reduced.

The above-described lifter present in the heating region may be continuously and integrally formed with the above-described supply-side spiral blade and/or the discharge-side spiral blade or may be formed as a separate body. Here, the height simply needs to be about ⅓ to ⅔ of the height of the fired powder filled. In addition, the shape of the lifter may be any shape easy to rake up and circulate the fired powder, but is preferably the same spiral shape as the above-described spiral blades.

EXAMPLES

Hereinafter, the present invention will be specifically described by showing examples. The technical scope of the present invention is not limited thereto.

Example 1

As starting raw materials of a positive electrode active material, lithium carbonate, nickel hydroxide, cobalt carbonate, manganese carbonate and titanium oxide were prepared. These starting raw materials were weighed so that the atomic proportions (Li:Ni:Co:Mn:Ti) reached 1.04:0.85:0.03:0.10:0.02, and a mixing step S1 was performed. Specifically, the starting raw materials were mixed together after ion exchange water was added thereto so that the total weight of the starting raw materials reached 20 mass %, crushed and mixed with a bead mill and made into a crushed powder having an average particle diameter of 0.16 μm. An obtained solid-liquid mixture was dried using a spray dryer, thereby obtaining a raw material powder mixture having an average particle diameter of 11.6 μm.

Next, an aluminum firing container was filled with the obtained raw material powder mixture, and a heat treatment (first heat treatment step S21) was performed at 360° C. for one hour in an atmospheric atmosphere with a roller hearth kiln, thereby obtaining a precursor (mixture). The first heat treatment step S21 did not only remove moisture absorbed by the raw material powder mixture but also made the thermal decomposition of nickel hydroxide and the partial thermal decomposition of each carbonate performed, whereby carbon dioxide was removed to a certain extent.

Next, the furnace of a rotary kiln described in FIG. 2 was put into a tilted state of a tilt angle of three degrees, and a precursor C as much as a filling rate of 30% was input (tilted input stage). Next, the furnace was put into a horizontal state of a tilt angle of zero degrees, and, in a furnace tube that was rotated in the forward direction at a rotation speed of 1 rpm, a batch heat treatment was performed for 15 hours at 700° C. in an oxidizing atmosphere with an oxygen concentration of 95% or higher while an oxygen stream was caused to flow from the outlet side toward the inlet side. Here, in the rotary kiln of the present configuration, spiral blades were attached along the inner circumferential surface of the furnace tube, and a supply-side spiral blade B and a discharge-side spiral blade A were formed of spiral blades wound in mutually opposite directions. During forward rotation, the spiral blades on the supply (inlet) side and the discharge (outlet) side move the precursor toward a heating region D. Here, in order to hold a fired powder in the heating region D with the spiral blades in regions other than the heating region, the heights of the spiral blades were set to the height of the fired powder filled or higher, on the other hand, in order to circulate the fired powder in the heating region, the height of a lifter F installed in the heating region was set to be lower than the heights of the supply-side and discharge-side spiral blades and to a height about half of other parts. Since blades having different heights were provided in the heating region and the other regions as described above, it is possible to circulate the fired powder present in the heating region in the heating region (horizontal firing stage).

After the batch heat treatment, the furnace tube was tilted to a tilt angle of three degrees, the furnace tube was rotated in the reverse direction at a rotation speed of 3 rpm, and the fired precursor (that is, the fired powder) E was discharged (tilted discharge stage). During reverse rotation, the supply-side spiral blade B moved the fired powder toward the inlet, and the discharge-side spiral blade A moved the fired powder toward the outlet. In addition, at the time of discharging the fired powders after batch operation, each weight as much as 10% of the total input amount was collected, and the elution amount of lithium carbonate of the collected powder was measured in order to confirm that the fired powder had been evenly fired from the discharge side throughout the supply side. The powder discharged for the first time was the fired powder present on the outlet side in the heating region, and the powder discharged in the end was the fired powder present on the inlet side in the heating region. Therefore, collection in installments makes it possible to observe a firing variation in the furnace during the batch operation. The results are jointly shown in FIG. 3.

Next, a heat treatment (third heat treatment step S23) was performed on the obtained fired powder using the roller hearth kiln at 840° C. for 10 hours in an oxidizing atmosphere with an oxygen concentration of 95% or higher, thereby obtaining a fired powder of a lithium complex compound having a composition of $Li_{1.0}Ni_{0.85}Co_{0.03}Mn_{0.10}Ti_{0.02}O_2$. The obtained fired powder of the lithium complex compound was classified to a mesh size of 45 μm and regarded as a positive electrode active material.

Figure 3:
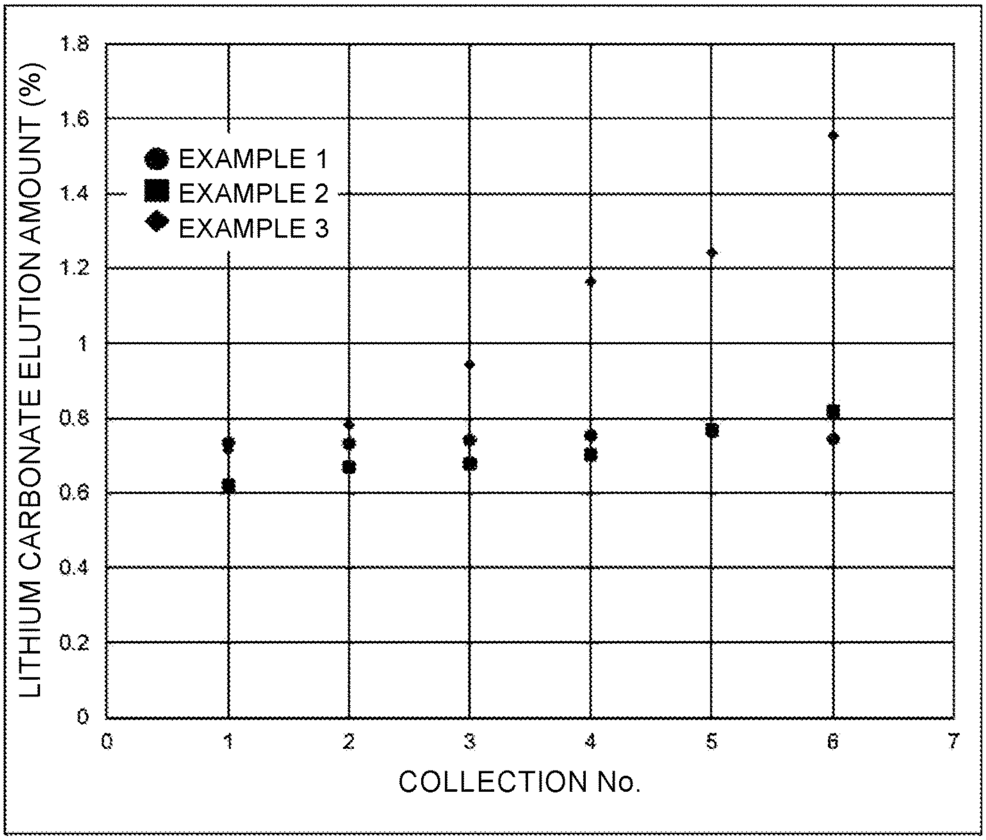
FIG. 3 is a view showing transitions of the elution amounts of lithium carbonate in fired powder according to examples.

Regarding the fired powder obtained by the batch firing treatment in Example 1, the elution amount of lithium carbonate from the fired powder and the reaction rate of lithium carbonate are shown in Table 1, and the transition of the elution amount with respect to the cumulative collected weight is shown in FIG. 3. In addition, the elution amount of lithium carbonate of the positive electrode active material (lithium complex compound) is shown in Table 1. Measurement methods will be described below.

Example 2

A fired powder was obtained in the same manner as in Example 1 except that, in the second heat treatment step, a rotary kiln with no lifters in the heating region was used and the holding time was set to 30 hours. In the batch operation, a precursor as much as a filling rate of 30% was input, and operation was performed at 700° C. for 30 hours in an oxidizing atmosphere with an oxygen concentration of 95% or higher. After that, the fired powder in the furnace was all discharged. Even at this time, after the end of the second heat treatment step, the fired powder was collected in installments in the same manner as in Example 1, and the elution amount of lithium carbonate of each fired powder was measured. The results are jointly shown in FIG. 3. In addition, the elution amount and reaction rate of lithium carbonate of the fired powder were measured in the same manner as in Example 1. The results are shown in Table 1.

Next, a positive electrode active material was obtained in the same manner as in Example 1 using the fired powder. The elution amount of lithium carbonate of this positive electrode active material was measured in the same manner as in Example 1. The results are shown in Table 1.

Example 3

A fired powder was obtained in the same manner as in Example 2 except that the operation of the second heat treatment step was performed for 18 hours. Even at this time, the fired powder was collected in installments in the same manner as in Example 1, and the elution amount of lithium carbonate of each fired powder was measured. The results are jointly shown in FIG. 3. In addition, the elution amount and reaction rate of lithium carbonate of the fired powder were measured in the same manner as in Example 1. The results are shown in Table 1.

Next, a positive electrode active material was obtained in the same manner as in Example 1 using the fired powder. The elution amount of lithium carbonate of this positive electrode active material was measured in the same manner as in Example 1. The results are shown in Table 1.

Comparative Example 1

A raw material powder mixture was produced in the same manner as in Example 1 except that the starting raw materials were weighed so that the atomic proportions (Li:Ni:Co:Mn:Ti) reached 1.04:0.90:0.03:0.05:0.02, and a first heat treatment was performed. A second heat treatment step was performed using a continuous operation type rotary kiln in which the raw material powder was continuously supplied in a state where a furnace tube was rotated at a rotation speed of 1 rpm and tilted at a tilt angle of one degree and was passed through a heating band. A fired powder was obtained in the same manner as in Example 1 except what has been described above. The continuous operation was performed with an input rate of 120 g/hr (as much as a filling rate of 3%). The continuous operation type is a type in which the precursor is supplied in a state where the furnace tube is tilted and fired while being caused to roll and advance in the same state and a fired powder is continuously discharged.

However, in the second heat treatment step, the fired powder adhered to the inner wall, which made it impossible to discharge the fired powder.

Comparative Example 2

Heat treatments were performed in the same manner as in Comparative Example 1 except that the heat treatment temperature in the second heat treatment step was set to 650° C. In Comparative Example 2, it was possible to collect a fired powder. Here, in the case of continuous operation, the holding time becomes one hour when the precursor passes through the rotary kiln once, and the precursor was passed a total of five times and the heat treatments as long as five hours were performed. Regarding the collection of the fired powder, each weight as much as 10% of the total input amount was collected in installments in the same manner as in Example 1, and the lithium carbonate elution amount of the obtained fired powder was measured. Furthermore, the reaction rate was calculated from the results. The results are shown in Table 1. It was possible to avoid adhesion by decreasing the temperature, but the lithium carbonate elution amount was large, and the reaction rate was less than 95%. In addition, since the third heat treatment step was performed with a continuous rotary kiln, the elution amount of lithium carbonate was as large as 0.40%, and it was not possible to sufficiently react lithium carbonate.

(Elution Amount of Lithium Carbonate)

The amount of the fired powder or lithium carbonate that was eluted from the positive electrode active material was measured by neutralization titration using an automatic titration device "COM-1700A" (manufactured by Hiranuma Co., Ltd.). In the beginning, 0.5 g of the positive electrode active material was dispersed in 30 mL of pure water bubbled with an argon gas. In addition, a dispersion was stirred for 60 minutes, then, a filtrate was collected by suction filtration, and the filtrate was titrated with hydrochloric acid. A titration curve has two stages, a stage up to a first equivalence point corresponds to the total amount of a hydroxide ion of lithium hydroxide and a carbonate ion of lithium carbonate, and a stage from the first equivalence point to a second equivalence point corresponds to the amount of a bicarbonate ion generated from the carbonate ion. Therefore, the amount (mass %) of lithium carbonate was calculated from the titration amount from the first equivalence point to the second equivalence point.

(Reaction Rate of Lithium Carbonate)

The reaction rate was calculated based on the following formula (4).

$$\text{Reaction rate (\%)} = [(L1 - L2) \div L1] \times 100 \tag{4}$$

L1: Lithium carbonate elution amount after first heat treatment (precursor)

L2: Lithium carbonate elution amount after second heat treatment (fired powder (Discharge Capacity of Positive Electrode Active Material)

Next, positive electrodes and lithium ion secondary batteries were produced using the positive electrode active materials obtained in the examples, and the discharge capacities of the lithium ion secondary batteries were evaluated. In Comparative Example 1, it was not possible to collect the positive electrode active material, and, in Comparative Example 2, it was possible to collect the positive electrode active material, but the reaction was insufficient. Therefore, evaluation was not performed.

In the beginning, the positive electrode active material, a binder and a conductive material were mixed together, thereby preparing a positive electrode mixture slurry. In addition, the prepared positive electrode mixture slurry was applied to a current collector made of a 20 μm-thick aluminum foil and dried at 120° C. to form a positive electrode mixture layer, and then the positive electrode mixture layer was compressively molded by pressing so that the electrode density reached 2.6 g/cm$^3$ and blanked into a disc shape having a diameter of 15 mm, thereby producing a positive electrode.

In addition, a negative electrode was produced using metallic lithium as a negative electrode active material. After that, a lithium ion secondary battery was produced using the produced positive electrode and negative electrode. As a non-aqueous electrolytic solution, a solution obtained by dissolving $LiPF_6$ in a solvent in which ethylene carbonate and dimethyl carbonate were mixed together so that the volume ratio reached 3:7 to a concentration of 1.0 mol/L was used. Each of the produced lithium ion secondary batteries was charged up to an end-of-charge voltage (4.3 V) with a constant current at a constant voltage with a charge current set to 0.2CA and was discharged up to an end-of-discharge voltage (3.3 V or 2.5 V) with a constant current with a discharge current set to 0.2CA, and the discharge capacity was measured.

The chemical compositions of the positive electrode active materials, the firing temperatures, the firing times (the heat treatment temperatures and the heat treatment times of the second and third heat treatment steps) and the like according to the above-described examples and comparative examples and the measurement results of the elution amount and the reaction rate of lithium carbonate and the discharge capacity will be shown in Table 1.

In addition, FIG. 3 shows the transitions of the elution amounts of lithium carbonate in the fired powder of Example 1, Example 2 and Example 3.

TABLE 1

| | Chemical composition | Second heat treatment step | | | |
|---|---|---|---|---|---|
| | | Firing temperature [° C.] | Firing time [h] | Filling rate [%] | Method |
| Example 1 | $Li_{1.04}Ni_{0.85}Mn_{0.10}Co_{0.03}Ti_{0.02}$ | 700 | 15 | 30 | Batch |
| Example 2 | | 700 | 30 | 30 | Batch |
| Example 3 | | 700 | 18 | 30 | Batch |
| Comparative Example 1 | $Li_{1.04}Ni_{0.90}Mn_{0.05}Co_{0.03}Ti_{0.02}$ | 700 | — | — | Continuous |
| Comparative Example 2 | $Li_{1.04}Ni_{0.90}Mn_{0.05}Co_{0.03}Ti_{0.02}$ | 650 | 5 | 3 | Continuous |

TABLE 1-continued

| Second heat treatment step | | Third heat treatment step | | | Discharge capacity |
|---|---|---|---|---|---|
| Lithium carbonate elution amount [mass %] | Lithium carbonate reaction rate [%] | Firing temperature [° C.] | Firing time [h] | Lithium carbonate elution amount [mass %] | [Ah/kg] 4.3 to 2.5 V 0.2CA |
| 0.7 to 0.8 | 97 to 98 | 840 | 10 | 0.19 | 195 |
| 0.6 to 0.8 | 97 to 98 | 840 | 10 | 0.2 | 194 |
| 0.7 to 1.6 | 95 to 98 | 840 | 10 | 0.23 | 183 |
| — | — | — | — | — | — |
| 3.2 to 3.7 | 87 to 89 | 820 | 1 | 0.40 | — |

According to FIG. 3, in Example 1 and Example 2, the changes in the elution amount of lithium carbonate were small due to the movement of the spiral blades. Particularly, in Example 1, the height of the lifter (spiral blade) in the heating region was set to be lower than others, which made it possible to effectively circulate the fired powder present in the heating region. As a result, while, conventionally, fired powder in regions with a high carbon dioxide concentration were fired only in the regions with a high carbon dioxide concentration during firing, the fired powder was further circulated, whereby it was possible to bring the fired powder into contact with a gas with a high oxygen concentration and make the reaction progress despite of the fact that the firing time was short. In Example 1, since all of the obtained powder characteristics were excellent, it can be said that the fired powder having excellent powder characteristics could be efficiently obtained. In Example 2, it was possible to make the reaction progress by extending the firing time. In Example 3, the holding time was 18 hours, which was short compared with that (30 hours) in Example 2. Here, a variation is also shown in the elution amount of lithium carbonate, which suggests that the firing time is not sufficient, and it can be said that the amounts of lithium carbonate between the collection lots become uniform by setting the holding time to 18 hours to 30 hours.

In addition, as shown in Table 1, it is possible to increase the reaction rate of lithium carbonate in the second heat treatment step, and a variation in the elution amount can be suppressed. In addition, the discharge capacity of the positive electrode active material that was obtained in the third heat treatment step became high. This is considered that, since the elution amount of lithium carbonate could be reduced, that is, the reaction rate of lithium carbonate could be improved in the second heat treatment step, the melting of lithium carbonate and the formation of a liquid phase became difficult in the third heat treatment step, and thus grain growth was further suppressed, and, as a result, the charge and discharge capacity of the positive electrode active material became high.

On the other hand, in the cases of the comparative examples where the continuous operation-type rotary kiln was used, the yields decreased, and the elution amounts of lithium carbonate became large. In addition, the fired powder were not discharged in the second heat treatment steps. This is because the melting point of lithium carbonate was suppressed, the viscosity of the powder increased, and thus operation was performed on the powder having an increased viscosity at a low rotation speed and a low tilt angle, which caused the adhesion of the powder. Once adhesion occurs, it is considered that it is difficult for the powder to move over a level difference attributed to the clumps of the adhering substance, the adhesion increases and the powder was stuck. It has been confirmed that, even when the rotation speed and the tilt angle are set to be high, the securement of the firing time in the heating region becomes difficult, and it is not possible to make a solid-phase reaction progress.

The invention claimed is:

1. A method for manufacturing a positive electrode active material for a lithium ion secondary battery, the method comprising:

a mixing step of mixing a lithium compound and a compound containing a metal element other than Li to obtain a powder mixture;

a first heat treatment step of thermally treating the powder mixture to obtain a precursor;

a second heat treatment step of thermally treating the precursor to obtain a fired powder; and a third heat treatment step of thermally treating the fired powder to obtain a lithium complex compound represented by the following formula (1), $$Li_{1+a}M1O_{2+\alpha} \quad (1)$$

wherein M1 is the metal element other than Li and includes at least Ni, a proportion of the Ni in M1 is 70 atom % or more and a and α are numbers satisfying $-0.1 \leq a \leq 0.2$ and $-0.2 \leq \alpha \leq 0.2$;

wherein 95 mass % or more of the lithium compound is reacted in the second heat treatment step having a batch firing process for heating the precursor while rolling the same in a heating region in a furnace tube, and the batch firing process has a tilted input stage for tilting the furnace tube and inputting the precursor from an inlet of a firing furnace, a horizontal firing stage for performing firing while making the furnace tube horizontal, and a tilted discharge stage for tilting the furnace tube and discharging the fired powder from an outlet of the firing furnace, wherein the furnace tube includes a supply-side spiral blade from the inlet to the heating region and a discharge-side spiral blade from the heating region to the outlet, opposite spiral grooves are formed in the supply-side spiral blade and the discharge-side spiral blade, and in the batch firing process, the precursor is collected in the heating region.

2. The method for manufacturing a positive electrode active material for a lithium ion secondary battery according to claim 1, wherein the furnace tube further includes a lifter in the heating region, and a height of the lifter is lower than heights of the supply-side spiral blade and/or the discharge-side spiral blade, thereby firing the precursor present in the heating region while circulating the same.

3. The method for manufacturing a positive electrode active material for a lithium ion secondary battery according to claim 2, wherein the lifter in the heating region is a spiral blade.

4. The method for manufacturing a positive electrode active material for a lithium ion secondary battery according to claim 1, wherein rotation speeds of the furnace tube in the tilted input stage and/or the tilted discharge stage are set to be higher than a rotation speed of the furnace tube in the horizontal firing stage.

5. The method for manufacturing a positive electrode active material for lithium ion secondary battery according to claim 1, wherein the formula (1) is represented by the following formula (2), $$Li_{1+a}Ni_bCo_cM_dX_eO_{2+\alpha} \quad (2)$$

wherein M represents at least one selected from the group consisting of Al and Mn, X represents at least one metal element other than Li, Ni, Co, Al and Mn, and a, b, c, d, e and a are numbers satisfying $-0.1 \leq a \leq 0.2$, $0.7 \leq b \leq 1.0$, $0 \leq c \leq 0.2$, $0 \leq d \leq 0.2$, $0 \leq e \leq 0.2$, $b+c+d+e=1$, and $-0.2 \leq a \leq 0.2$, respectively, an average particle diameter of a slurry in the mixing step is set to 0.1 μm or more and 0.5 μm or less, an average particle diameter of secondary particles in a granulated powder obtained by granulating the slurry is set to 5 μm or more and 20 μm or less, the first heat treatment step thermally treats the granulated powder at a heat treatment temperature of 200° C. or higher and 500° C. or lower for 0.5 hours or longer and five hours or shorter to obtain the precursor, the second heat treatment step thermally treats the precursor at a heat treatment temperature of 600° C. or higher and lower than 750° C. for 10 hours or longer and 100 hours or shorter in an oxidizing atmosphere to obtain the fired powder, and the third heat treatment step thermally treats the fired powder at a heat treatment temperature of 750° C. or higher and 900° C. or lower for 0.5 hours or longer and 50 hours or shorter in an oxidizing atmosphere to obtain the lithium complex compound.

* * * * *